United States Patent [19]

Kinoshita et al.

[11] 4,169,131
[45] Sep. 25, 1979

[54] PROCESS FOR RECOVERING CAUSTIC ALKALI FROM SPENT ALKALI LIQUOR

[75] Inventors: Yoshiaki Kinoshita, Hino; Toshiaki Kurihara, Kitasoma; Yoshiyuki Imagire, Tokyo, all of Japan

[73] Assignee: Nittetu Chemical Engineering Limited, Tokyo, Japan

[21] Appl. No.: 886,475

[22] Filed: Mar. 14, 1978

[30] Foreign Application Priority Data

Oct. 5, 1977 [JP] Japan .............................. 52/119015

[51] Int. Cl.² .............................................. C01D 1/04
[52] U.S. Cl. ..................................... 423/203; 423/204; 423/641
[58] Field of Search ........................ 423/641, 203, 204

[56] References Cited
U.S. PATENT DOCUMENTS 1,757,592  5/1930  Schleicher ............................ 23/290

FOREIGN PATENT DOCUMENTS 116702  9/1975  Japan .

OTHER PUBLICATIONS

Babor, Basic College Chemistry, Second Edition, Thomas Y. Crowell Company, New York (1953), pp. 255-260.
Kirk-Othmer, Encyclopedia of Chemical Technology, vol. 13, Second Edition (1967), p. 861.

Primary Examiner—O. R. Vertiz
Assistant Examiner—Wayne A. Langel
Attorney, Agent, or Firm—Lane, Aitken & Ziems

[57] ABSTRACT

A process for recovering caustic alkali from spent alkali liquor, in which a spent alkali liquor and iron oxide are roasted to obtain a product containing alkali ferrate and the product of roasting is hydrolyzed at a temperature over 110° C. and under pressurized conditions where liquid phase is retained, thereby recovering caustic alkali in the form of an aqueous solution of a concentration higher than approximately 15 wt% containing dissolved iron in an extremely small concentration.

8 Claims, 2 Drawing Figures

PROCESS FOR RECOVERING CAUSTIC ALKALI FROM SPENT ALKALI LIQUOR

BACKGROUND OF THE INVENTION

This invention relates to a process for recovering caustic alkali from spent alkali liquor, and more particularly to an improved process for recovering from spent alkali liquor caustic alkali of high purity and concentration by hydrolyzing at a temperature above 110° C. a roasted product of the spent alkali liquor and iron oxide.

The term "spent alkali liquor" as herein used means waste liquors which occur in various chemical processes in which an organic substance is treated with alkali, for instance, a waste liquor discharged from a process where an organic acidic substance is treated with alkali, including the alkali-containing waste liquors discharged from pulp cooking and bleaching processes using caustic alkali.

In recovering caustic alkali from spent alkali liquors which are discharged from various chemical processes, it is known to burn and roast a spent alkali liquor together with iron oxide and to hydrolyze the roasted product at a temperature below 100° C. and under normal pressure.

For example, Japanese Patent Application No. 49-21631 describes a process in which a spent alkali liquor discharged from a fibrous material cooking or bleaching operation by the use of caustic alkali is burned and melted together with iron oxide at a temperature of 700°–900° C. and the resulting melt is dropped into water and dissolved at a temperature of 50°–100° C. to obtain an aqueous solution of caustic soda.

In Japanese Patent Application No. 51-154920, waste organic acidic substances which are produced in various chemical processes, such as spent phenol and carboxylic acids, are neutralized by reaction with a caustic alkali solution, followed by the steps of removing an organic alkali salt solution by extraction and/or absorption, roasting the organic alkali salt solution together with ferric oxide in an oxidative atmosphere over 800° C. to obtain ashes and, after or while grinding the ashes, leaching out caustic alkali with water for separation from the sediment which mainly consists of ferric oxide.

The caustic alkali recovery processes described in the above-mentioned two Japanese Patent Applications are based on the following Reactions (1)–(3):

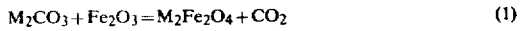

$$M_2CO_3 + Fe_2O_3 = M_2Fe_2O_4 + CO_2 \quad (1)$$

$$M_2O + Fe_2O_3 = M_2Fe_2O_4 \quad (2)$$

$$M_2Fe_2O_4 + H_2O = 2MOH + Fe_2O_3 \quad (3)$$

wherein M represents an alkali metal.

Upon combustion, the spent alkali liquor with organic contents as mentioned above is converted into alkali carbonate and/or alkali oxide, which simultaneously undergo Reactions (1) and (2), respectively, to result in alkali ferrate. According to Reaction (3), the alkali ferrate is hydrolyzed into caustic alkali and ferric oxide, normally at a temperature below 100° C.

However, it has been found that the velocity of hydrolysis in the above-mentioned known processes is unexpectedly low especially where the produced alkali concentration is relatively high, and the yield of hydrolysis is at most about 60–70% at a temperature below 100° C. when the alkali contentration is over 10%.

In the above-mentioned known processes, the loss of non-recovered caustic alkali, which forms in the conventional hydrolysis condition, can be prevented by recirculating the alkali ferrate residues which have not undergone the hydrolysis. However, recirculation of a large quantity of residual alkali ferrate requires apparatus of large scale and is disadvantageous from the standpoint of energy economy. It will thus be obvious that the rate of hydrolysis should be as high as possible.

Generally, the yield of hydrolysis is further lowered when recovering an aqueous solution of caustic alkali of such a high concentration as to have any practical value, about 15 wt% or more, coupled with another disadvantage in that the recovered solution contains dissolved iron in a high concentration. The presence of a large quantity of dissolved iron in the recovered aqueous alkali solution limits the use of the solution or otherwise will bring about undesired reactions or contamination in use. Therefore, it is advantageous to reduce the dissolved iron content in the recovered aqueous alkali solution to a minimum.

SUMMARY OF THE INVENTION

It is an object of the present invention to provide improvements to the known process of recovering caustic alkali from spent alkali liquor by forming an intermediate roasted product which contains alkali ferrate.

It is another object of the present invention to provide a process for recovering caustic alkali from spent alkali liquor, in which the intermediate roasted product which contains alkali ferrate undergoes hydrolysis according to Reaction Formula (3) at an increased yield of at least 80% and preferably more than 90% and the concentration of dissolved iron in the aqueous solution of caustic alkali obtained as a result of the hydrolysis is held to at most about 50 mg/l and preferably less than about 30 mg/l.

It is still another object of the invention to provide a process for recovering caustic alkali from spent alkali liquor, which can recover caustic alkali as an aqueous solution of high concentration, preferably higher than approximately 15 wt%, with a minimum content of dissolved iron.

We have found that it becomes possible to attain a high yield of hydrolysis even with a high caustic alkali concentration, while holding the concentration of dissolved iron within an allowable range, by letting alkali ferrate react with water at a temperature over 110° C. and in liquid phase under pressurized conditions.

According to the present invention, there is provided a process for recovering caustic alkali from spent alkali liquor, comprising roasting the spent alkali liquor together with iron oxide, reacting the product of roasting which contains alkali ferrate with water at a temperature over 110° C. and under pressurized conditions in which liquid phase is retained, and separating the resultant aqueous caustic alkali solution.

The above and other objects, features and advantages of the invention will become apparent from the following description.

DETAILED DESCRIPTION OF THE INVENTION

Figure 1:
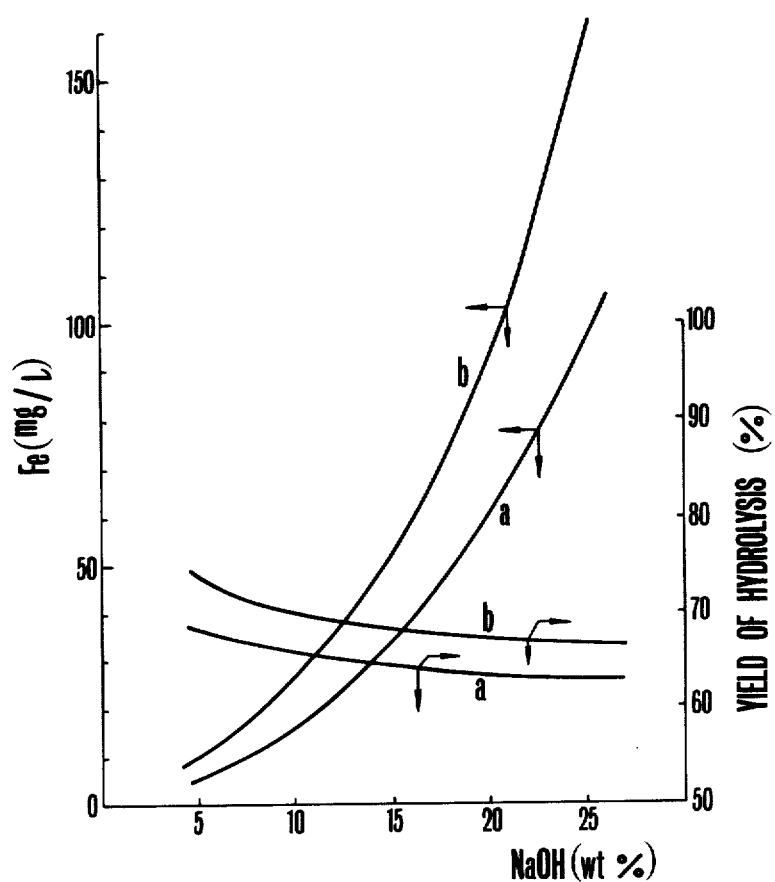
FIG. 1 is a graph showing the relationships between caustic soda concentration, yield of hydrolysis or decomposition and dissolved iron concentration in the aqueous solution in the hydrolysis of alkali ferrate at a temperature below 100° C. under normal pressure.

Referring to FIG. 1, curves a and b show the relationships between the caustic soda concentration in the aqueous solution, rate of hydrolysis and dissolved iron concentration in the aqueous solution in conventional processes effecting the hydrolyzing operation at 65° C. for 3 hrs. and at 98° C. for 0.5 hr., respectively, on a mixture of iron oxide and sodium ferrate which is obtained by 1 hr's roasting at 950° C. of a mixture containing iron oxide and sodium carbonate in a molar ratio of 1.3:1 (and starch which is added as an organic substance in an equal amount to sodium carbonate). The drawbacks of the conventional processes are apparent from this graph.

Figure 2:
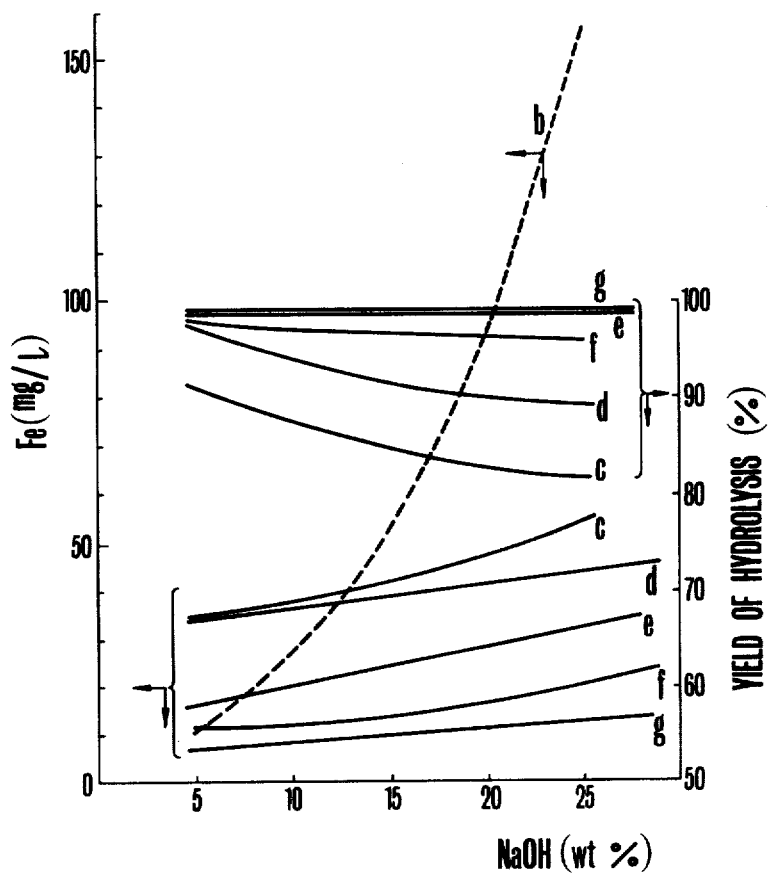
FIG. 2 is a graph similar to FIG. 1 but showing the results of the hydrolysis under conditions according to the invention, namely, at a temperature over 110° C. and under pressurized conditions.

FIG. 2 is a graph similar to FIG. 1 but showing the results of hydrolysis of the mixture of iron oxide and sodium ferrate under conditions according to the present invention. More particularly, indicated by curves c to g are the results of hydrolysis at 110° C., 120° C. and 150° C. each for 0.5 hr., at 150° C. for 5 min. and at 180° C. for 2 min., respectively. The curve b of 98° C./0.5 hr. in FIG. 1 is also plotted with a dotted line for the purpose of comparison. It will be seen from the graph of FIG. 2 that unexpected results are obtained by making the reaction temperature 110° C. or higher. The effects are most distinctively manifested with the caustic soda concentration over 15 wt%.

The superiority and inherent advantages of the process of the present invention, wherein the hydrolysis is carried out at a temperature higher than 110° C. and in liquid phase under pressure, as compared with the conventional processes, will become more apparent from the following description, reference being had to FIGS. 1 and 2.

Generally, in the hydrolysis of alkali ferrate under given temperature conditions, a higher caustic alkali concentration at the end of the reaction normally means a lower hydrolytic conversion, as shown in FIGS. 1 and 2. In contrast to the conventional processes carried out at a temperature below 100° C. with hydrolytic conversion not higher than 60–70% (FIG. 1), the process of the invention can produce a caustic alkali solution of high concentration with conversion of at least 80% (FIG. 2). Though not shown in FIG. 2, it has been experimentally proven that a conversion as high as 90% or more is attained if the hydrolysis is carried out at 130° C. As clear from FIG. 2, the conversion increases with temperature and the hydrolysis becomes almost perfect at 180° C. even where a caustic alkali solution of high concentration is produced. From curves e and f which show the hydrolytic conversions at 150° C. for 30 min. and 5 min., respectively, it will be seen that the velocity of hydrolysis under the conditions of the invention is extremely high.

With regard to the concentration of dissolved iron, the concentration increases with the temperature of hydrolysis below 100° C. (FIG. 1). In particular, the concentration of dissolved iron increases rapidly where the caustic alkali concentration in the final product exceeds approximately 15 wt%, as seen in FIG. 1. In contrast, in the hydrolytic reaction under the temperature conditions of above 110° C. according to the present invention, surprisingly, the concentration of dissolved iron in the final aqueous solution tends to be reduced as the temperature increases, as shown in FIG. 2. According to the process of the present invention, it is possible to suppress the concentration of the dissolved iron to less than 50 mg/l and further to about 10 mg/l by increasing the reaction temperature. In addition, the increases in the caustic alkali concentration in the recovered solution are accompanied by only a small increment of the dissolved iron as compared with the cases shown in FIG. 1.

Gathering from the foregoing, it is important to effect the hydrolysis at a temperature over 110° C., preferably at 130°–180° C. Theoretically, the upper limit of the feasible reaction temperature is the critical point where the solution can retain liquid phase, and can be raised over the critical temperature of water per se due to the existence of the caustic alkali. However, it is practical to have the upper temperature held below 300° C., preferably at about 250° C. in view of the resistance to pressure, corrosion, quality of material, running cost and the like.

The residence time for the hydrolytic reaction depends not only upon the intended caustic alkali concentration and the yield but also upon the reaction temperature and the type of the reactor to be used. In general, a tubular reactor requires a shorter time than an autoclave to attain the same results. At high temperatures, a residence time of several seconds to several tens of minutes is sufficient for substantially completing the reaction but a treatment of longer time periods will give better results in terms of the color hue of the reaction liquid. More particularly, a reaction liquid which has undergone treatment over a short time period has a pale yellow-green color, whereas a longer treatment at high temperatures results in a pale yellowish or almost colorless reaction liquid. It follows that the residence time should be determined according to the purpose for which the reaction liquid is to be used or other conditions.

A pressure is applied during the hydrolytic reaction according to the invention in order to retain the reaction system in liquid phase. To obtain an aqueous solution of caustic alkali by hydrolysis of alkali ferrate, water is added beforehand in an amount which is suitable for the desired concentration in consideration of the amount of alkali ferrate to be hydrolyzed. Application of pressure is necessary since otherwise evaporative escape of water would occur in a considerable amount at temperatures over 110° C. and it would become difficult to maintain the liquid phase of the reaction system. The pressure to be applied varies depending upon the reaction temperature and the intended concentration of the final caustic alkali solution or other conditions. As the temperature is raised from 110° C. to about 300° C., the pressure which is necessary for maintaining the above-mentioned conditions varies from the vapor pressure at 110° C. to about 100 atms. Normally, 50 atms. or lower pressure is used and the liquid phase can be suitably retained at 2–8 atms in the temperature range of 130°–180° C. The pressurization is effected by utilization of the vapor pressure of the reaction system or by means of an inert gas such as nitrogen gas or air which has been stripped of $CO_2$.

The alkalies in the spent liquor which is treated by the process of the present invention includes, needless to say, may be alkali metal salts such as of sodium, lithium, potassium and the like. When the spent liquor is admixed with iron oxide powder (Fe₂O₃) and roasted at a temperature over 800° C., the alkali in the spent liquor is converted into alkali carbonate and/or alkali oxide and then into alkali ferrate. In the preparation of the alkali ferrate, it is the usual practice to use iron oxide in an excess amount for the purpose of reducing the amount of unreacted alkali carbonate which remains without reacting with iron oxide and for increasing the reaction velocity. The mixture of alkali ferrate and excess iron oxide is preferred to be powdered sufficiently prior to the hydrolysis in order to ensure good contact with water and reaction velocity. However, even if the powdering is omitted, iron oxide is gradually released from the surfaces to permit the hydrolytic reaction over a long run.

The reactor to be used for the process of the invention may be a batch or continuous type autoclave which is provided with heating or cooling means and capable of stirring the charged material. Alternatively, there may be employed a pressure resistant reactor of tubular type, fluidized bed type, moving bed type, multi-staged type or of a type in which the residence time is secured by recirculation of the reactants. The raw material is charged into the reactor along with water to undergo the hydrolytic reaction under the predetermined conditions. Of course, the reaction is effected in an atmosphere free of carbon dioxide. The hydrolyzed product consists of a mixture of fine particles of iron oxide and an aqueous solution of caustic alkali which can be separated from each other by the use of a sedimentation vessel, filter, decanter or other suitable separating means.

It will be appreciated from the foregoing description that, according to the process of the present invention, caustic alkali can be obtained from alkali ferrate easily and in a high concentration which meets practical needs, while reducing the contents of dissolved iron and other impurities. The process of the invention can be used advantageously particularly in a case where caustic alkali is recirculated upon recovery from an alkali-containing organic waste material. The invention can also be applied to the hydrolysis of a smelt which is produced by roasting a mixture of sodium carbonate and iron oxide powder, for converting sodium carbonate into caustic soda.

EXAMPLE 1

A mixture which was obtained by admixing Fe₂O₃, Na₂CO₃ and starch in weight ratios of 1.96: 1: 1 (molar ratio of Fe₂O₃ to Na₂CO₃ = 1.3) was put in an alumina crucible, as representative of a spent alkali liquor, and calcined in an electric furnace for 1 hour at 950° C. in the presence of air to obtain a calcined product. The product was cooled in an atmosphere free of carbon dioxide and then powdered in an atmosphere of inert gas to a size below 100 mesh. The powder was used as a sodium ferrate sample.

About 7-8 grs. of the ferrate sample and 6 ml. of water were charged into a nickel-lined autoclave with an inner volume of 15 ml. Then, the autoclave was purged with N₂ gas, which was charged up to 10 atms. to prevent escape of water under reaction conditions. The reaction was conducted at 150° C. for predetermined time periods while shaking the autoclave. After cooling, the liquid was discharged from the autoclave and filtered. The resulting filtrate was analyzed to obtain the following results.

| Reaction Time | NaOH Concentration in Filtrate | Dissolved Iron Concentration | Yield of Hydrolysis | Color Hue of Filtrate |
|---|---|---|---|---|
| 5 min. | 25.4% | 20.2 mg/l | 96.2% | Pale Yellowish |
| 30 min. | 25.5% | 31.5 mg/l | 98.7% | Pale Yellow |
| 300 min. | 25.9% | 7.8 mg/l | 100% | Colorless |

COMPARATIVE EXAMPLE

About 8 grs. of the same sample as used in Example 1 and 6 mls. of water were placed in an autoclave of the same type as in Example 1. After displacement of air in the autoclave with N₂ gas, the reaction was conducted at 98° C. for 30 min. The test results are shown below.

| NaOH Concentration in Filtrate | Dissolved Iron Concentration | Rate of Hydrolysis | Color Hue of Filtrate |
|---|---|---|---|
| 22.1% | 112 mg/l | 66.6% | Pale green |

EXAMPLE 2

A mixture of cyclohexanone and cyclohexanol which was obtained by oxidizing cyclohexane with air by the use of an oxidizing device was treated with a 23% aqueous NaOH solution for extraction to obtain an extract (spent alkali liquor) containing sodium salts of organic acids with the following analytical values.

Analytical Values of Extract C: 18.5% (weight); H: 2.9%; O: 17.1%; Na: 9.3%; H₂O: 52.2%.

2.44 parts of the extract was mixed with 1 part of iron oxide (molar ratio of Fe₂O₃ to Na₂O = 1.27) and evaporated to dryness while agitating. The resulting product was placed in a rotary kiln-type furnace and roasted at about 1000° C. while burning an auxiliary fuel added in an amount of about 1.4 parts per 100 parts of the extract. The residence time was about 30 minutes. The black roasted product was wet milled in a ball mill, to which was added 99 parts of water per 100 parts of the product to give a slurry. The slurry was passed for hydrolysis into a tubular reactor at 150° C. and a residence time of about 5 min.

An aqueous solution which was obtained by separating iron oxide by filtration had the following analytical values with a yield of hydrolysis of about 99%.

Analytical Results
NaOH: 23.0%
Na₂CO₃: 1.6%
Dissolved Iron: 19 mgFe/l

What is claimed is:

1. In a process for recovering caustic alkali from spent alkali liquor wherein the spent alkali liquor is roasted with iron oxide to obtain a roasted product which contains alkali ferrate, followed by hydrolysis of the roasted product, the improvement comprising:

reacting the roasted product with water at a temperature not lower than 110° C. and under sufficient pressure to maintain the reaction system in liquid phase; and separating the resultant aqueous caustic alkali solution.

2. The process as defined in claim 1, wherein said roasted product and water are reacted in an atmosphere of an inert gas.

3. The process as defined in claim 2, wherein said inert gas is $N_2$ or $CO_2$-stripped air.

4. The process as defined in claim 1, wherein said roasted product and water are reacted at temperatures of 130°–180° C.

5. The process as defined in claim 1, wherein said spent alakli liquor is a waste liquid resulting from treatment of an organic acidic substance with an alkali.

6. The process as defined in claim 1, wherein said spent alkali liquor is a waste liquor discharged from pulp cooking or bleaching with an alkali.

7. The process as defined in claim 1, further comprising powdering said roasted product containing alkali ferrate prior to the reaction with water.

8. A process according to claim 1 wherein the aqueous caustic alkali solution which is recovered has a caustic soda concentration of over 15 weight percent.

* * * * *